US012568316B2

(12) United States Patent
Kawamura

(10) Patent No.: US 12,568,316 B2
(45) Date of Patent: Mar. 3, 2026

(54) INFORMATION PROCESSING DEVICE AND CONTROL METHOD THEREOF

(71) Applicant: CANON KABUSHIKI KAISHA, Tokyo (JP)

(72) Inventor: Takuya Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 18/586,865

(22) Filed: Feb. 26, 2024

(65) Prior Publication Data

US 2024/0292113 A1 Aug. 29, 2024

(30) Foreign Application Priority Data

Feb. 28, 2023 (JP) ................................. 2023-029426

(51) Int. Cl.
| | |
|---|---|
| *H04N 23/84* | (2023.01) |
| *H04N 5/907* | (2006.01) |
| *H04N 23/62* | (2023.01) |
| *H04N 23/63* | (2023.01) |
| *H04N 23/667* | (2023.01) |

(52) U.S. Cl.
CPC ............. *H04N 23/84* (2023.01); *H04N 5/907* (2013.01); *H04N 23/62* (2023.01); *H04N 23/631* (2023.01); *H04N 23/667* (2023.01)

(58) Field of Classification Search
None
See application file for complete search history.

(56) References Cited

U.S. PATENT DOCUMENTS

| | | | | |
|---|---|---|---|---|
| 10,506,199 | B2 * | 12/2019 | Peng ......................... | H04N 5/20 |
| 2017/0105042 | A1 * | 4/2017 | Toma ................. | G11B 27/3027 |
| 2017/0279530 | A1 * | 9/2017 | Tsukagoshi .......... | G02B 6/4214 |
| 2018/0054660 | A1 * | 2/2018 | Hwang ................ | H04N 21/235 |
| 2021/0250518 | A1 | 8/2021 | Nashizawa | |
| 2022/0036858 | A1 * | 2/2022 | Kitamura .................. | G06T 5/92 |
| 2022/0053118 | A1 * | 2/2022 | Nashizawa .......... | H04N 23/741 |

(Continued)

FOREIGN PATENT DOCUMENTS

| | | |
|---|---|---|
| EP | 3163890 B1 | 8/2020 |
| JP | 2018007194 A | 1/2018 |

OTHER PUBLICATIONS

"Study Group Report High-Dynamic-Range (HDR) Imaging Ecosystem", Society of Motion Picture and Television Engineers, Inc. (SMPTE), Sep. 19, 2015 (53 pages).

(Continued)

*Primary Examiner* — Cynthia Segura
(74) *Attorney, Agent, or Firm* — Venable LLP

(57) ABSTRACT

An information processing device performs a first setting relating to an opto-electronic transfer function (OETF), performs a second setting relating to an electro-optical transfer function (EOTF), generates a developed image by applying development processing to a RAW image according to the first setting, and performs control to record the developed image on a storage medium. In a case when the first setting is a setting corresponding to a high dynamic range and the second setting is a setting corresponding to a dynamic range different from the high dynamic range, control is performed to record the developed image and meta information corresponding to the second setting on the storage medium in association with each other.

19 Claims, 7 Drawing Sheets

(56)         References Cited

U.S. PATENT DOCUMENTS

| | | | |
|---|---|---|---|
| 2023/0230618 A1* | 7/2023 | Atkins ................. | G11B 27/031 |
| | | | 386/278 |
| 2024/0013356 A1* | 1/2024 | Chen ......................... | G06T 5/50 |
| 2025/0088615 A1* | 3/2025 | Ando ..................... | H04N 23/76 |

OTHER PUBLICATIONS

Extended European Search Report issued Jul. 9, 2024, in corresponding European Patent Application No. 24159907.5 (9 pages).

* cited by examiner

301 RAW IMAGE DATA

302 WHITE BALANCE UNIT

303 COLOR INTERPOLATION UNIT

304 MATRIX CONVERSION UNIT

305 GAMMA CONVERSION UNIT

306 COLOR-BRIGHTNESS ADJUSTMENT UNIT

307 COMPRESSION UNIT

308 RECORDING CONTROL UNIT

309 IMAGE FILE

START

↓

ACQUIRE SETTING INFORMATION ON OETF — S401

↓

ACQUIRE SETTING INFORMATION ON EOTF — S402

↓

DEVELOPMENT PROCESSING — S403

↓

RECORD IMAGE AND META DATA — S404

↓

END

| 501 | |
|---|---|
| ftyp | 502 |
| moov | 503 |
| trak | 504 |
| Etc | 505 |
| mdat | 506 |

INFORMATION PROCESSING DEVICE AND CONTROL METHOD THEREOF

CROSS REFERENCE TO PRIORITY APPLICATION

This application claims the benefit of Japanese Patent Application No. 2023-029426, filed on Feb. 28, 2023, which is hereby incorporated by reference herein in its entirety.

BACKGROUND OF THE INVENTION

Field of the Invention

The present invention relates to an information processing device and a control method thereof and, in particular, to photographing of HDR images.

Description of the Related Art

Recent imaging devices (for example, digital cameras) are capable of photographing HDR images. HDR is an abbreviation for a high dynamic range, and shows a dynamic range wider than a standard dynamic range (SDR).

It is disclosed in Japanese Patent Application Laid-open No. 2018-7194 that the content of HDR video is recorded together with identification information showing whether the content is HDR video.

There is a case that a user photographs an HDR image and then confirms and compiles the HDR image while recognizing the same as an SDR image (as it is) without performing gradation conversion. However, even if the user wants to confirm and compile the HDR image while recognizing the same as the SDR image, there is a possibility that gradation conversion to convert the HDR image into the SDR image (narrow a dynamic range from HDR to SDR) is automatically performed, whereby the user becomes unable to perform desired confirmation and compilation.

SUMMARY OF THE INVENTION

The present invention provides a technique to prevent trouble that a user recognizes an image of HDR as an image of another dynamic range and becomes unable to perform confirmation.

The present invention in its first aspect provides an information processing device including at least one memory and at least one processor which function as: a first setting unit configured to perform a first setting relating to an opto-electronic transfer function (OETF); a second setting unit configured to perform a second setting relating to an electro-optical transfer function (EOTF); a development unit configured to generate a developed image by applying development processing to a RAW image according to the first setting; and a recording control unit configured to perform control to record the developed image on a storage medium, wherein in a case where the first setting is a setting corresponding to a high dynamic range and the second setting is a setting corresponding to a dynamic range different from the high dynamic range, the recording control unit performs control to record the developed image and meta information corresponding to the second setting on the storage medium in association with each other.

The present invention in its second aspect provides an information processing device including at least one memory and at least one processor which function as: a first setting unit configured to perform a first setting relating to an opto-electronic transfer function (OETF); a second setting unit configured to perform a second setting relating to an electro-optical transfer function (EOTF); a development unit configured to generate a developed image by applying development processing to a RAW image according to the first setting; and a display control unit configured to perform control to display the developed image on a display, wherein in a case where the first setting is a setting corresponding to a high dynamic range and the second setting is a setting corresponding to a dynamic range different from the high dynamic range, the display control unit performs control to display the developed image on the display with a display setting corresponding to the second setting.

The present invention in its third aspect provides a control method of an information processing device, including: performing a first setting relating to an opto-electronic transfer function (OETF); performing a second setting relating to an electro-optical transfer function (EOTF); generating a developed image by applying development processing to a RAW image according to the first setting; and recording the developed image on a storage medium, wherein in a case where the first setting is a setting corresponding to a high dynamic range and the second setting is a setting corresponding to a dynamic range different from the high dynamic range, control is performed to record the developed image and meta information corresponding to the second setting on the storage medium in association with each other.

The present invention in its fourth aspect provides a control method of an information processing device, including: performing a first setting relating to an opto-electronic transfer function (OETF); performing a second setting relating to an electro-optical transfer function (EOTF); generating a developed image by applying development processing to a RAW image according to the first setting; and performing control to display the developed image on a display, wherein in a case where the first setting is a setting corresponding to a high dynamic range and the second setting is a setting corresponding to a dynamic range different from the high dynamic range, control is performed to display the developed image on the display with a display setting corresponding to the second setting.

The present invention in its fifth aspect provides a non-transitory computer readable medium that stores a program, wherein the program causes a computer to execute a control method of an information processing device, the control method including: performing a first setting relating to an opto-electronic transfer function (OETF); performing a second setting relating to an electro-optical transfer function (EOTF); generating a developed image by applying development processing to a RAW image according to the first setting; and recording the developed image on a storage medium, wherein in a case where the first setting is a setting corresponding to a high dynamic range and the second setting is a setting corresponding to a dynamic range different from the high dynamic range, control is performed to record the developed image and meta information corresponding to the second setting on the storage medium in association with each other. The present invention in its sixth aspect provides a non-transitory computer readable medium that stores a program, wherein the program causes a computer to execute a control method of an information processing device, the control method including: performing a first setting relating to an opto-electronic transfer function (OETF); performing a second setting relating to an electro-optical transfer function (EOTF); generating a developed image by applying development processing to a RAW image according to the first setting; and performing control to display the developed image on a display, wherein in a case where the first setting is a setting corresponding to a high dynamic range and the second setting is a setting corresponding to a dynamic range different from the high dynamic range, control is performed to display the developed image on the display with a display setting corresponding to the second setting.

Further features of the present invention will become apparent from the following description of exemplary embodiments with reference to the attached drawings.

DESCRIPTION OF THE EMBODIMENTS

Hereafter, embodiments of the present invention will be described in detail with reference to the accompanying drawings. Note that the following embodiments do not intend to limit the present invention according to claims. In the following embodiments, a plurality of features will be described. However, the plurality of features are not necessarily essential for the present invention and may be arbitrarily combined together. In addition, the same or similar configurations will be denoted by the same reference symbols, and their duplicated descriptions will be omitted. Further, an example in which the present invention is applied to a digital camera will be described in the following embodiments. However, information processing devices to which the present invention is applicable are not limited to digital cameras. For example, the present invention is applicable to various imaging devices (for example, smartphones and tablet terminals). The present invention is also applicable to information processing devices such as smartphones, tablets, and personal computers (PCs) connected to imaging devices (or capable of communicating with the imaging devices).

Figure 1:
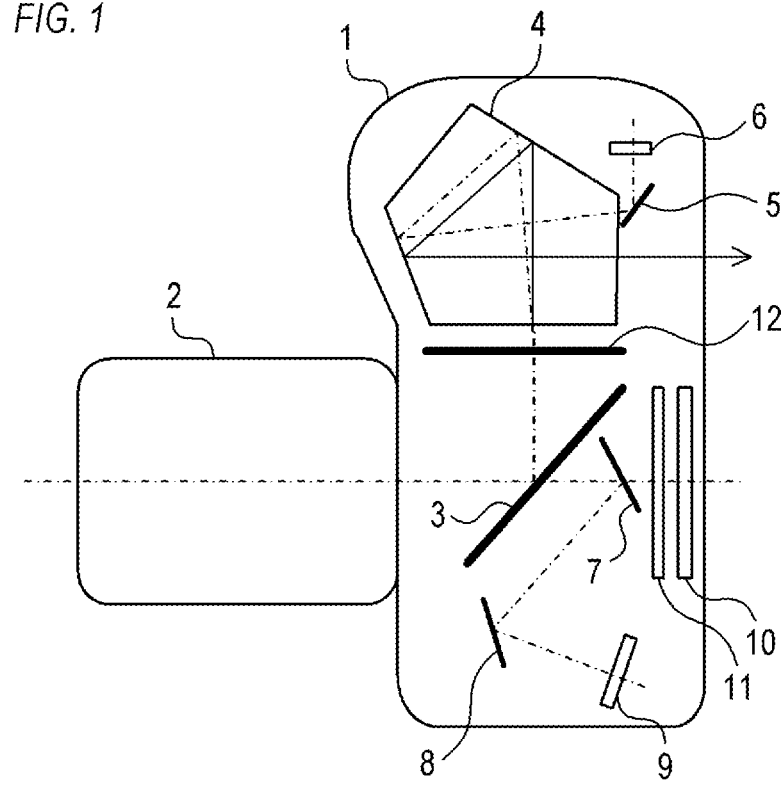
FIG. 1 is a cross-sectional diagram of a camera.

FIG. 1 is a cross-sectional diagram showing an arrangement example of main constituting elements (for example, optical members and sensors) of a digital camera (hereinafter, a camera) according to the present embodiment. In FIG. 1, the camera is a lens-interchangeable digital single lens reflex camera, and has a camera body 1 and an interchangeable lens 2. In the camera body 1, an imaging element 10 is, for example, a CMOS image sensor or a CCD image sensor, and a plurality of pixels (storage-type photoelectric conversion elements) are arrayed in the imaging element 10. A mechanical shutter 11 provided near the front of the imaging element 10 controls an exposure timing and an exposure time of the imaging element 10.

A semi-transmissive main mirror 3 and a first reflection mirror 7 arranged on the rear surface of the main mirror 3 jump up at the time of photographing. A second reflection mirror 8 reflects a light flux reflected by the first reflection mirror 7 toward a focus detection sensor (AF sensor) 9. The AF sensor 9 is, for example, an imaging element having a smaller number of pixels than that of the imaging element 10. The first reflection mirror 7, the second reflection mirror 8, and the AF sensor 9 are constituting elements used to perform focus detection at an arbitrary position within an imaging range by a phase difference detection system.

A photometric sensor (AE sensor) 6 receives an object image (an optical image indicating an object) reflected by a pentaprism 4 and a third reflection mirror 5. The AE sensor 6 is capable of outputting brightness information on an object for each of a plurality of regions of a light-receiving unit. The number of the regions is not particularly limited. The AE sensor 6 is, for example, an imaging element having a smaller number of pixels than that of the imaging element 10. The various imaging elements have, other than pixels arranged in their light-receiving units, an amplification circuit for a pixel signal and a peripheral circuit for signal processing.

A finder optical system is configured by the pentaprism 4. Although not shown in FIG. 1, an object image reflected by the pentaprism 4 is observable from an eyepiece. A part of a light beam outside an optical axis among those reflected by the main mirror 3 and diffused by a focusing plate 12 is incident on the AE sensor 6. The interchangeable lens 2 communicates with the camera body 1 as occasion demands via a contact of a lens mount unit provided in the camera body 1. Note that exposure control or focus adjustment control is performed using information on a captured image since the main mirror 3 and the first reflection mirror 7 jump up at the time of displaying a live view and recording a moving image.

Figure 2:
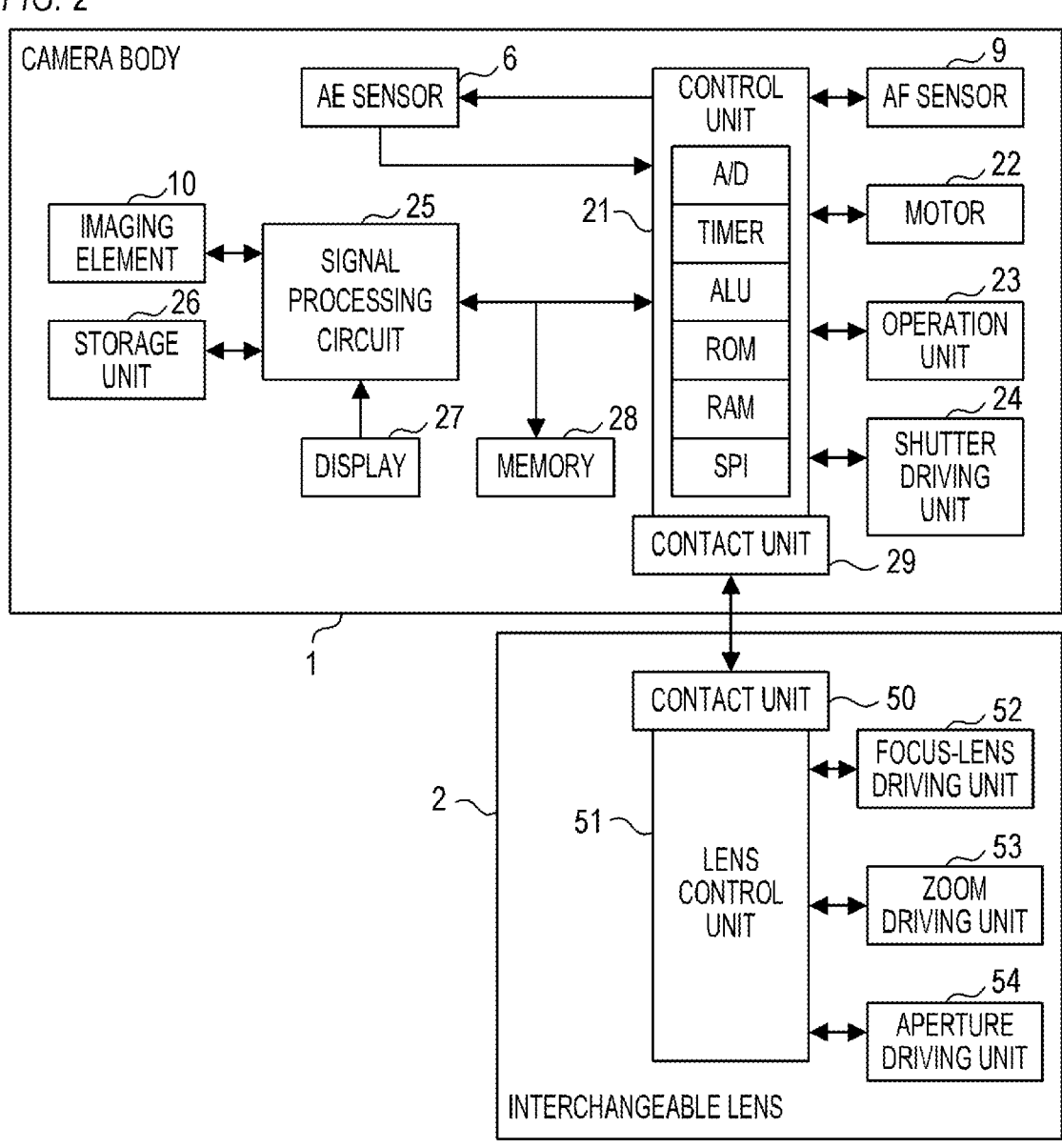
FIG. 2 is a block diagram of the camera.

FIG. 2 is a block diagram showing a configuration example of an electric circuit of the camera (the camera body 1 and the interchangeable lens 2) shown in FIG. 1. In the camera body 1, a control unit 21 is a one-chip microcomputer in which an arithmetic and logic unit (ALU), a ROM, a RAM, an A/D converter, a timer, and a serial communication port (SPI) are, for example, embedded. The control unit 21 controls operations of the camera body 1 and the interchangeable lens 2 by, for example, loading a program stored in the ROM into the RAM and running the loaded program. A specific operation of the control unit 21 will be described later.

Signals output from the AF sensor 9 and the AE sensor 6 are connected to an input terminal of the A/D converter of the control unit 21. A signal processing circuit 25 controls the imaging element 10 according to instructions from the control unit 21, and applies A/D conversion and signal processing to a signal output from the imaging element 10 to obtain an image signal. Further, the signal processing circuit 25 performs required image processing such as compression and synthesis when recording an obtained image signal. A memory 28 is, for example, a DRAM, and used as a work memory when the signal processing circuit 25 performs various signal processing or used as a VRAM when an image is displayed on a display 27 that will be described later. The display 27 is a display unit such as a rear liquid-crystal display of the camera body 1 and an external display, and displays various information and images such as camera setting values, messages, a menu screen, and captured images. The display 27 enables HDR display (display in an HDR mode). HDR is an abbreviation for a high dynamic range, and shows a dynamic range wider than a standard dynamic range (SDR). The display 27 is controlled according to instructions from the control unit 21. A storage unit 26 is, for example, a semiconductor memory card, and an image signal of a captured image is input from the signal processing circuit 25 to the storage unit 26.

A motor 22 controls up/down movement of the main mirror 3 and the first reflection mirror 7 according to instructions from the control unit 21. An operation unit 23 is an input-device group used by a user to operate the camera. The operation unit 23 includes, for example, a release switch used to provide instructions to perform a photographing standby operation or instructions to perform photographing operations (performing photographing of a still image and starting photographing of a moving image), a photographing-mode selection switch used to select a photographing mode, a direction key, and a determination key. A contact unit 29 is a contact used to communicate with the interchangeable lens 2, and an input/output signal line of a serial communication port of the control unit 21 is connected to the contact unit 29. A shutter driving unit 24 drives the mechanical shutter 11 (controls an opening/closing operation of the mechanical shutter 11) according to instructions from the control unit 21.

The interchangeable lens 2 is provided with a contact unit 50 that corresponds to the contact unit 29. The contact unit 50 is connected to a lens control unit 51 that is a one-chip microcomputer similar to that of the control unit 21, and communication with the lens control unit 51 is possible via the contact unit 50. The lens control unit 51 has, for example, a microprocessor, a ROM, and a RAM, and controls the operation of the interchangeable lens 2 on the basis of instructions from the control unit 21 by loading a program stored in the ROM into the RAM and running the loaded program. Further, the lens control unit 51 notifies the control unit 21 of various information such as a state of the interchangeable lens 2. A focus-lens driving unit 52 is connected to an output terminal of the lens control unit 51, and drives a focus lens. A zoom driving unit 53 changes an angle of view of the interchangeable lens 2 according to instructions from the lens control unit 51. An aperture driving unit 54 adjusts an aperture amount of an aperture according to instructions from the lens control unit 51.

When the interchangeable lens 2 is attached to the camera body 1, the data communication between the lens control unit 51 and the control unit 21 (data communication via the contact units 29 and 50) is enabled. Further, power (for example, power used to drive a motor and an actuator) is supplied from the camera body 1 to the interchangeable lens 2 via the contact units 29 and 50. In the data communication, information required by the control unit 21 to perform focus detection and exposure computation (for example, optical information inherent in the interchangeable lens 2 and an object distance based on a distance encoder) is, for example, output from the lens control unit 51 to the control unit 21. Further, results (focus adjustment information and aperture information) of focus detection and exposure computation performed by the control unit 21 are output from the control unit 21 to the lens control unit 51. The lens control unit 51 controls a position of the focus lens according to focus adjustment information, and controls an aperture amount of an aperture according to aperture information.

First Embodiment

Hereafter, a first embodiment of the present invention will be described. In the first embodiment, a photographing operation (operation from photographing to recording) of the camera will be described. For example, when a power switch included in the operation unit 23 shown in FIG. 2 is operated by a user and power of the camera (camera body 1) is turned on, the control unit 21 becomes operatable and performs initialization processing. In the initialization processing, the control unit 21 performs communication with the lens control unit 51 to obtain various lens information for focus detection and photometry. The control unit 21 performs various settings (for example, the setting of an arbitrary photographing mode) according to an operation by the user on the operation unit 23. When a shutter switch included in the operation unit 23 is pressed half, the control unit 21 performs a photographing standby operation including automatic focus (AF) processing and automatic exposure (AE) processing. Subsequently, the control unit 21 performs the photographing operation when the shutter switch is pressed full.

Figure 3:
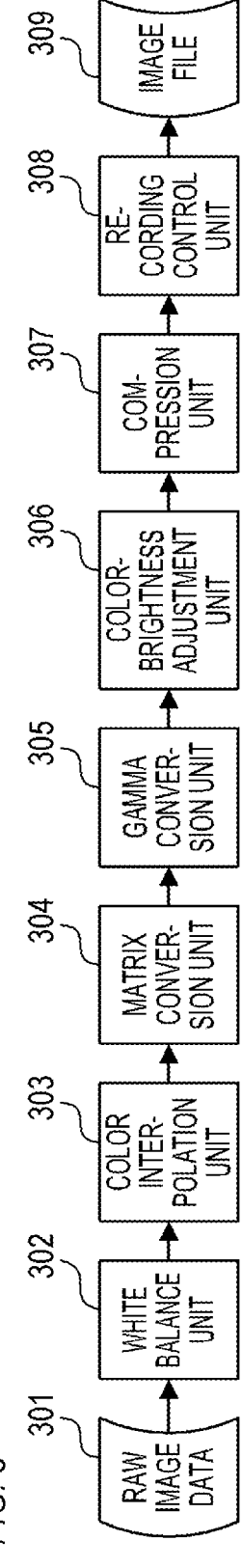
FIG. 3 is a block diagram of a function configuration relating to a photographing operation according to a first embodiment.
Figure 4:
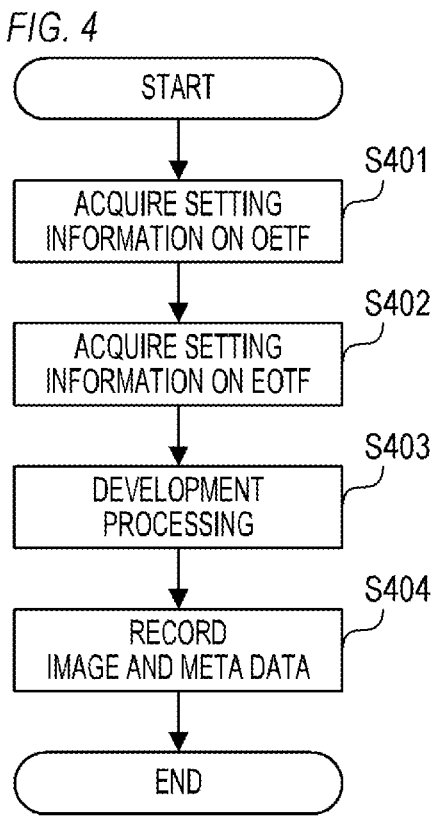
FIG. 4 is a flowchart of the photographing operation according to the first embodiment.

The photographing operation will be described with reference to FIGS. 3 and 4. FIG. 3 is a block diagram showing an example of a function configuration relating to the photographing operation, and FIG. 4 is a flowchart showing an example of the photographing operation. In FIG. 3, respective units are function units corresponding to processing performed by the control unit 21. However, at least one function unit may be realized by a hardware circuit. RAW image data 301 (image data of a RAW image) obtained by imaging is configured by a plurality of pixel data. Each of the plurality of pixel data configuring the RAW image data 301 indicates the strength of a color of a color filter provided in a corresponding pixel (photoelectric conversion element), and does not have information on other colors. Here, the respective pixels of an imaging element are provided with any of red (R), green (G), and blue (B) color filters.

In S401 of FIG. 4, the control unit 21 acquires setting information on an opto-electronic transfer function (OETF). In the first embodiment, a user is enabled to specify an OETF using the operation unit 23. When the OETF is specified by the user, the control unit 21 performs a setting relating to the specified OETF. In S401, information on a specified (set) OETF is acquired. For example, the user is enabled to specify an OETF of hybrid log gamma (HLG) defined in ITU-R recommendation BT.2100 as an OETF corresponding to HDR. Further, the user is enabled to specify an OETF corresponding to ITU-R recommendation BT.709 as an OETF corresponding to SDR. As an OETF corresponding to HDR, inverse characteristics of an electro-optical transfer function (EOTF) of perceptual quantization (PQ) defined in ITU-R recommendation BT.2100 may be specified. The setting, specification, and information of an OETF may be interpreted as the setting, specification, and information of a color gamut corresponding to the OETF. An opto-optical transfer function (OOTF) may be used in combination with an OETF. For example, when a dynamic range of a recorded image (developed image that will be described later) depends on a photographing mode, a change in the dynamic range corresponding to a change in the photographing mode may be realized by an OOTF.

In S402, the control unit 21 acquires setting information on an EOTF. In the first embodiment, the user is enabled to specify an EOTF using the operation unit 23. When the EOTF is specified by the user, the control unit 21 performs a setting relating to the specified EOTF. In S402, information on a set (specified) EOTF is acquired. For example, the user is enabled to specify inverse characteristics of an OETF of HLG as an EOTF corresponding to HDR, and specify an EOTF corresponding to ITU-R recommendation BT.709 as an EOTF corresponding to SDR. As an EOTF corresponding to HDR, an EOTF of PQ may be specified. The EOTF corresponding to the setting information acquired in S402 is the same as or different from the inverse characteristics of the OETF corresponding to the setting information acquired in S401 depending on cases. When setting information on a specific OETF is acquired in S401, information on the specific OETF (for example, inverse characteristics of the set OETF) may be acquired as setting information on an OETF regardless of the setting (specification) of an EOTF. The setting, specification, and information of an EOTF may be interpreted as the setting, specification, and information of a color gamut corresponding to the EOTF.

In S403, the control unit 21 generates a developed image by applying development processing to a RAW image according to the setting information (the setting of the OETF) acquired in S401. The development processing includes, for example, processing from the processing of a white balance unit 302 to the processing of a color-brightness adjustment unit 306 in FIG. 3.

The white balance unit 302 performs white balance processing to correct color fogging caused by a light source to reproduce white. For example, the white balance unit 302 plots respective pixel data (data of a red (R) component, data of a green (G) component, or data of a blue (B) component) configuring the RAW image data 301 into a prescribed color space such as an xy color space. The white balance unit 302 calculates integrated values (an integrated value of the R component, an integrated value of the G component, and an integrated value of the B component) of the pixel data plotted near a black-body radiation locus corresponding to a light-source color in the prescribed color space. Then, the white balance unit 302 calculates a white balance coefficient of the R component and a white balance coefficient of the B component from the calculated integrated values. The white balance unit 302 performs white balance processing by applying the calculated white balance coefficients to the RAW image data 301.

A color interpolation unit 303 performs noise reduction processing and color interpolation processing on the RAW image data after the white balance processing. Thus, color image data in which the respective pixel data include all color information on the R component, the G component, and the B component is generated.

The color image data generated by the color interpolation unit 303 is converted into basic color image data by the processing of a matrix conversion unit 304 and a gamma conversion unit 305. Here, the gamma conversion unit 305 performs gradation conversion (gamma conversion) using the OETF corresponding to the setting information acquired in S401.

Then, the color-brightness adjustment unit 306 performs processing to improve the appearance of an image on a color image obtained by the gamma conversion unit 305. For example, the color-brightness adjustment unit 306 performs image correction such as detecting an evening scene and emphasizing chroma.

In S404, the control unit 21 (compression unit 307) compresses the developed image (high-resolution image) generated in S403 in a prescribed format such as HEVC. Then, the control unit 21 (recording control unit 308) records the developed image after the compression and meta information (meta data) corresponding to the setting information (the setting of the EOTF) acquired in S402 on the storage unit 26 (storage medium) in association with each other. For example, in a case where the setting information (the setting of the OETF) acquired in S401 corresponds to HDR and the setting information (the setting of the EOTF) acquired in S402 corresponds to SDR, the developed image and meta data corresponding to SDR are recorded on the storage unit 26 in association with each other. In the first embodiment, the recording control unit 308 outputs an image file 309 including the developed image and the meta data. The output image file 309 is stored in the storage unit 26. Note that the file of the developed image and the file of the meta data may be separately created.

Figure 5:
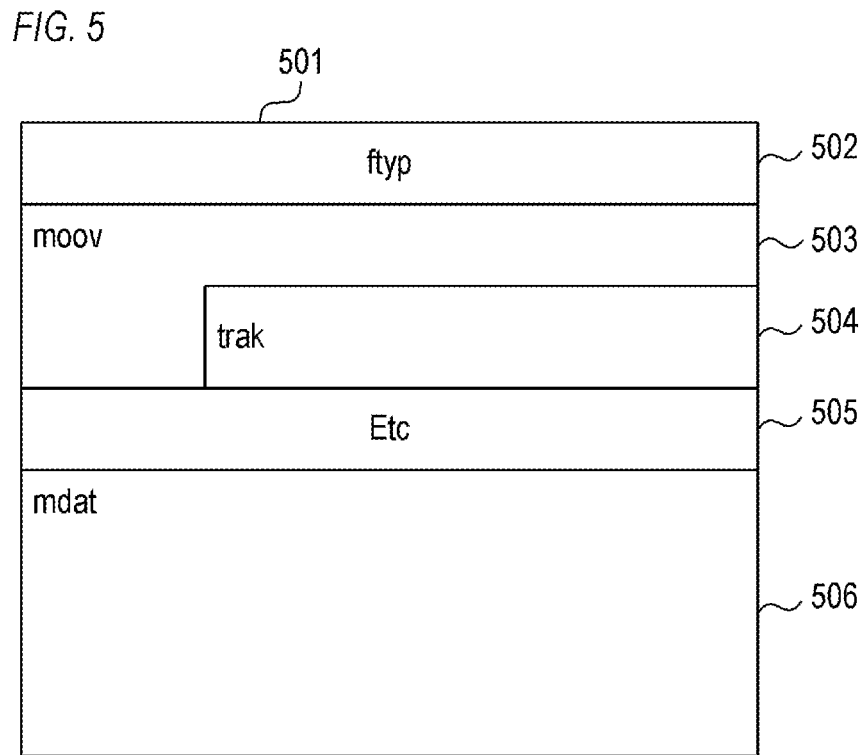
FIG. 5 is a schematic diagram of an image file according to the first embodiment.

FIG. 5 shows an example of the structure of an image file. An image file 501 has ftype 502 in the first place, and then has moov 503, Etc 505, and mdat 506 in the second, third, and fourth places, respectively. The ftype 502 is a box in which a file type is stored (described). The moov 503 is a box in which meta data is stored. The mdat 506 is a box in which media data (image data) is stored. The Etc 505 is a box in which other data is stored. The moov 503 has, as a child element, trak 504 that is a box in which meta data relating to an image is stored. In S404, information showing at least one of the EOTF and the color gamut corresponding to the setting information acquired in S402 is stored in the trak 504 as meta data corresponding to the setting information (the setting of the EOTF) acquired in S402. Note that the setting information (the setting of the EOTF) acquired in S402 may be stored in other specific regions. The image file may have, as a container format (image file format), a high-efficiency image file (HEIF) format defined in ISO/IEC 23008-12. The image file may have, as a container format (image file format), an MP4 format defined in ISO/IEC 14496-15. The image file may have other container formats (image file formats).

Figure 6:
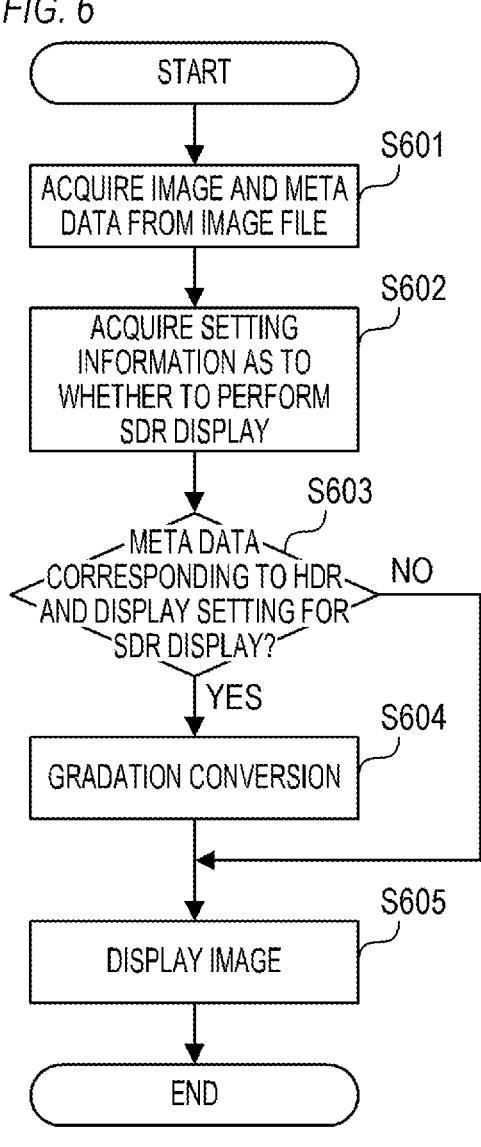
FIG. 6 is a flowchart of a reproduction operation.

The storage unit 26 may be removed from the camera (camera body 1) and attached to a reproduction device not shown. The reproduction device is enabled to reproduce an image file recorded on the storage unit 26 in S404 of FIG. 4. The reproduction device automatically performs gradation conversion when meta data corresponding to HDR is contained in an image file and SDR display (display in an SDR mode) is performed. The gradation conversion performed by the reproduction device is, for example, processing to convert an HDR image (an image of a high dynamic range) into an SDR image (an image of a standard dynamic range). FIG. 6 is a flowchart showing an example of a reproduction operation in the reproduction device.

In S601, the reproduction device acquires an image and meta data from an image file.

In S602, the reproduction device acquires setting information as to whether to perform SDR display.

In S603, the reproduction device determines whether a condition that the meta data acquired in S601 corresponds to HDR and that the setting information acquired in S602 corresponds to SDR (a display setting to perform SDR display has been made) is satisfied. The processing proceeds to S604 when the condition is satisfied. Otherwise, the processing proceeds to S605.

In S604, the reproduction device performs gradation conversion to convert an HDR image (an image of HDR) into an SDR image (an image of SDR) on the image acquired in S601. The conversion properties of the gradation conversion are determined on the basis of the meta data (for example, an EOTF) acquired in S601.

In S605, the reproduction device displays an image. When the processing of S604 is performed, an image after the gradation conversion of S604 is displayed. When the processing of S604 is not performed, the image acquired in S601 (the image before the gradation conversion of S604) is displayed. The reproduction device performs SDR display or HDR display as image display according to a display setting.

In a case where the user photographs an HDR image and wants to confirm and compile the HDR image while recognizing the same as an SDR image (as it is) without performing gradation conversion, he/she specifies an OETF corresponding to HDR (S401 of FIG. 4) and then specifies an EOTF corresponding to SDR (S402). Therefore, meta data corresponding to SDR is stored in an image file (S404). As a result, the processing of S604 is not performed, and the user is enabled to perform desired confirmation and compilation.

Note that an example in which setting information as to whether to perform SDR display is acquired in S602 is described above, but setting information on a display color gamut may be acquired in S602. In S603, a determination may be made as to whether a color gamut corresponding to meta data acquired in S601 matches a color gamut corresponding to setting information acquired in S602. The processing may proceed to S604 when the color gamut corresponding to the meta data does not match the color gamut corresponding to the setting information. Otherwise, the processing may proceed to S605. Then, in S604, gradation conversion to obtain an image of the color gamut corresponding to the setting information acquired in S602 may be performed on an image acquired in S601. Further, an example in which the display device separate from the camera displays an image is described above, but the processing of FIG. 6 may be performed as processing to display an image on the display 27 by the camera.

As described above, it is possible to record, as meta information on a recorded image, meta information corresponding to a dynamic range different from a dynamic range of the image in the first embodiment. Thus, trouble that a user recognizes an image (video) of HDR as an image (video) of another dynamic range (for example, SDR) and becomes unable to perform confirmation and compilation is prevented. For example, automatic gradation conversion is prevented so that the user recognizes an HDR image as an SDR image and is enabled to perform confirmation and compilation.

Second Embodiment

Figure 7:
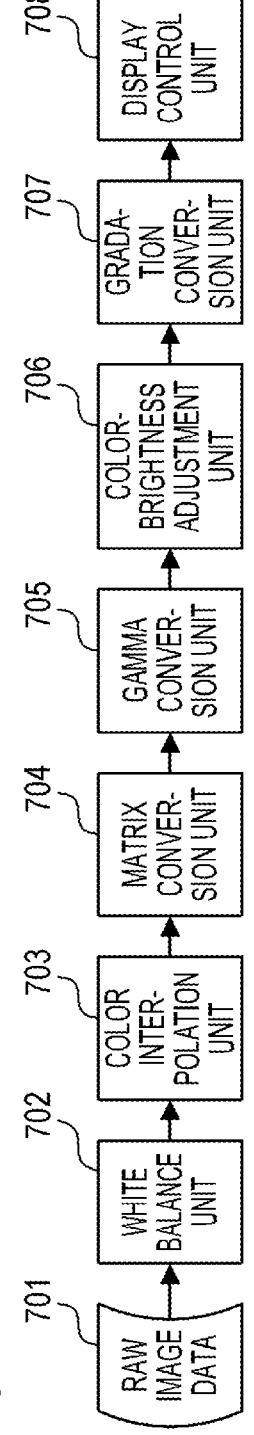
FIG. 7 is a block diagram of a function configuration relating to a display operation according to a second embodiment.
Figure 8:
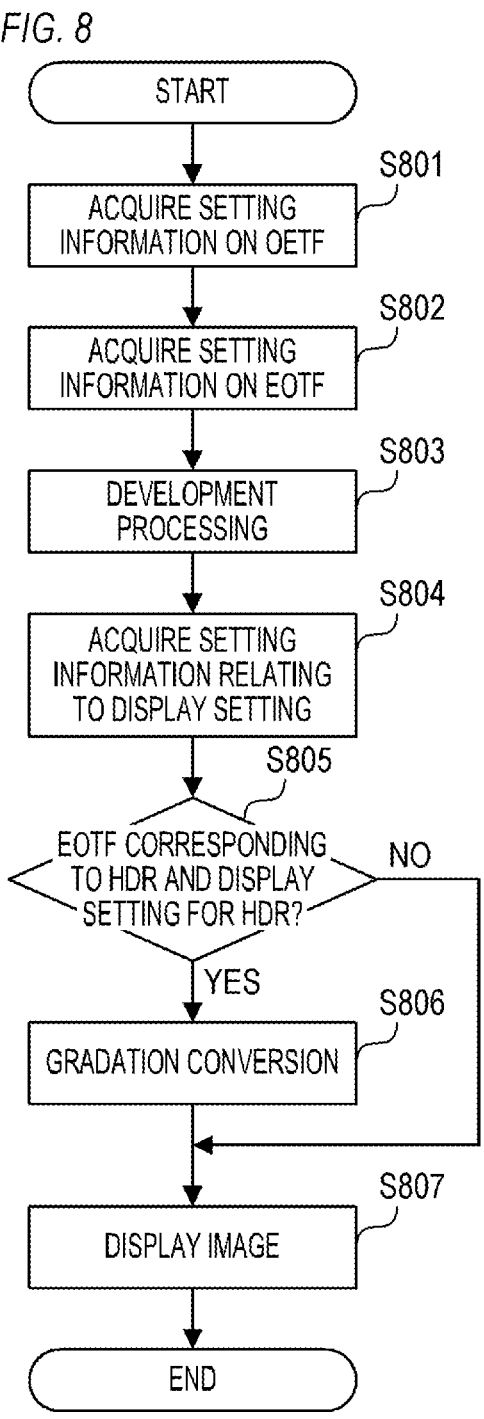
FIG. 8 is a flowchart of the display operation according to the second embodiment.

Hereafter, a second embodiment of the present invention will be described. In the second embodiment, a display operation (an operation from imaging to display, an operation of live-view display) of a camera will be described with reference to FIGS. 7 and 8. FIG. 7 is a block diagram showing an example of a function configuration relating to the display operation, and FIG. 8 is a flowchart showing an example of the display operation. Note that a display 27 corresponds to SDR, and is unable to perform HDR display but able to perform only SDR display.

In FIG. 7, RAW image data 701 to a color-brightness adjustment unit 706 are the same as the RAW image data 301 to the color-brightness adjustment unit 306 shown in FIG. 3. Further, in FIG. 8, the processing of S801 to S803 is the same as the processing of S401 to S403 shown in FIG. 4.

In S804, a control unit 21 acquires setting information on a display setting. For example, the display setting is a setting as to whether to perform gradation conversion, and the gradation conversion is processing to convert an HDR image into an SDR image. In this case, a display setting to perform the gradation conversion may be interpreted as a display setting corresponding to HDR, and a display setting not to perform the gradation conversion may be interpreted as a display setting corresponding to SDR. For example, a user is enabled to specify the validity or invalidity of the gradation conversion using an operation unit 23, and the control unit 21 sets the validity or invalidity of the gradation conversion according to user's specification.

In S805, the control unit 21 determines whether a condition that setting information (the setting of an EOTF) acquired in S802 corresponds to HDR and that setting information acquired in S804 corresponds to HDR is satisfied. The processing proceeds to S806 when the condition is satisfied. Otherwise, the processing proceeds to S807.

In S806, the control unit 21 (a gradation conversion unit 707) performs gradation conversion on a developed image generated in S803. As described above, the gradation conversion is, for example, processing to convert an HDR image into an SDR image. The conversion properties of the gradation conversion are determined on the basis of the setting information (the setting of the EOTF) acquired in S802.

In S807, the control unit 21 (a display control unit 708) displays an image on the display 27. When the processing of S806 is performed, an image after the gradation conversion of S806 is displayed. When the processing of S806 is not performed, the image acquired in S803 (an image before the gradation conversion of S806) is displayed. For example, when the setting information (the setting of the EOTF) acquired in S802 corresponds to SDR, the gradation conversion of S806 is not performed and the image generated in S803 is displayed even where the display setting to perform the gradation conversion in S806 has been made. That is, the image is displayed with a display setting corresponding to SDR (a display setting not to perform the gradation conversion in S806).

In a case where the user photographs an HDR image and wants to confirm and compile the HDR image while recognizing the same as an SDR image (as it is) without performing gradation conversion, he/she specifies an OETF corresponding to HDR (S801) and then specifies an EOTF corresponding to SDR (S802). Therefore, an image generated in S803 (an image before the gradation conversion of S806) is displayed on the display 27. Thus, the user is enabled to recognize an HDR image as an SDR image and photograph the HDR image while confirming the same.

As described above, it is possible to display a captured image with a display setting corresponding to a dynamic range different from a dynamic range of the captured image (a developed image generated in S803) in the second embodiment. Thus, a user is enabled to recognize an image (video) of HDR as an image (video) of another dynamic range (for example, SDR) and photograph the HDR image while confirming the same.

According to the present invention, trouble that a user recognizes an image of HDR as an image of another dynamic range and becomes unable to perform confirmation is prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing device comprising:
   at least one memory and at least one processor that function as a plurality of units comprising:
   (1) a first setting unit configured to set an opto-electronic transfer function (OETF);
   (2) a second setting unit configured to set an electro-optical transfer function (EOTF);
   (3) a development unit configured to generate a developed image by applying development processing to a RAW image according to the set OETF; and
   (4) a recording control unit configured to perform control to record the developed image in a storage medium,
   wherein in a case where (a) the set OETF corresponds to a high dynamic range and (b) the set EOTF corresponds to a dynamic range different from the high dynamic range, the recording control unit performs control to record the developed image and meta information in the storage medium in association with each other, and
   wherein the meta information comprises information regarding a color gamut corresponding to the set EOTF.

2. The information processing device according to claim 1, wherein the at least one memory and the at least one processor further function as a display control unit configured to perform control to display the developed image on a display, and
   wherein, in a case where (a) the set OETF corresponds to a high dynamic range and (b) the set EOTF corresponds to a dynamic range different from the high dynamic range, the display control unit performs control to display the developed image on the display without performing gradation conversion.

3. The information processing device according to claim 2, wherein the gradation conversion is processing to convert an image of a high dynamic range into an image of a standard dynamic range.

4. The information processing device according to claim 1, wherein the set OETF is an OETF of hybrid log gamma (HLG) defined in ITU-R recommendation BT.2100.

5. The information processing device according to claim 1, wherein the development processing includes gradation conversion corresponding to the set OETF.

6. The information processing device according to claim 1, wherein the dynamic range different from the high dynamic range is a standard dynamic range.

7. The image processing device according to claim 1, wherein in a case where (a) the set OETF corresponds to a high dynamic range and (b) a display setting to perform gradation conversion has been made, the gradation conversion is prevented from being carried out in accordance with the set EOTF corresponding to a dynamic range different from the high dynamic range.

8. The image processing device according to claim 7, wherein the gradation conversion is carried out in accordance with the set EOTF corresponding to the high dynamic range.

9. The image processing device according to claim 1, wherein in a case where (a) the set OETF corresponds to a high dynamic range and (b) the set EOTF corresponds to a dynamic range different from the high dynamic range, gradation conversion is prevented from being carried out even in a case where a setting has been made for gradation conversion to be carried out.

10. An information processing device comprising:
    at least one memory and at least one processor that function as a plurality of units comprising:
    (1) a first setting unit configured to set an opto-electronic transfer function (OETF);
    (2) a second setting unit configured to set an electro-optical transfer function (EOTF);
    (3) a development unit configured to generate a developed image by applying development processing to a RAW image according to the set OETF; and
    (4) a display control unit configured to perform control to display the developed image on a display,
    wherein, in a case where (a) the set OETF corresponds to a high dynamic range and (b) the set EOTF corresponds to a dynamic range different from the high dynamic range, the display control unit performs control to display the developed image on the display without performing gradation conversion.

11. The information processing device according to claim 10, wherein the gradation conversion is processing to convert an image of a high dynamic range into an image of a standard dynamic range.

12. The information processing device according to claim 10, wherein the set OETF is an OETF of hybrid log gamma (HLG) defined in ITU-R recommendation BT.2100.

13. The information processing device according to claim 10, wherein the development processing includes gradation conversion corresponding to the set OETF.

14. The information processing device according to claim 10, wherein the dynamic range different from the high dynamic range is a standard dynamic range.

15. The information processing device according to claim 10, wherein in a case where (a) the set OETF corresponds to the high dynamic range and (b) a display setting to perform gradation conversion has been made, the gradation conversion is (1) carried out in accordance with the set EOTF corresponding to the high dynamic range and (2) prevented from being carried out in accordance with set EOTF corresponding to the dynamic range different from the high dynamic range.

16. A control method of controlling an information processing device, the method comprising:
    setting an opto-electronic transfer function (OETF);
    setting an electro-optical transfer function (EOTF);

generating a developed image by applying development processing to a RAW image according to the set OETF; and recording the developed image in a storage medium, wherein, in a case where (a) the set OETF corresponds to a high dynamic range and (b) the set EOTF corresponds to a dynamic range different from the high dynamic range, control is performed to record the developed image and meta information in the storage medium in association with each other, and wherein the meta information comprises information regarding a color gamut corresponding to the set EOTF.

17. A control method of controlling an information processing device, the method comprising:

setting an opto-electronic transfer function (OETF);

setting an electro-optical transfer function (EOTF);

generating a developed image by applying development processing to a RAW image according to the set OETF; and performing control to display the developed image on a display, wherein, in a case where (a) the set OETF corresponds to a high dynamic range and (b) the set EOTF corresponds to a dynamic range different from the high dynamic range, control is performed to display the developed image on the display without performing gradation conversion.

18. A non-transitory computer-readable medium that stores a program, wherein the program causes a computer to execute a control method of controlling an information processing device, the control method comprising:

setting an opto-electronic transfer function (OETF);

setting an electro-optical transfer function (EOTF);

generating a developed image by applying development processing to a RAW image according to the set OETF; and recording the developed image in a storage medium, wherein, in a case where (a) the set OETF corresponds to a high dynamic range and (b) the set EOTF corresponds to a dynamic range different from the high dynamic range, control is performed to record the developed image and meta information in the storage medium in association with each other, and wherein the meta information comprises information regarding a color gamut corresponding to the set EOTF.

19. A non-transitory computer-readable medium that stores a program, wherein the program causes a computer to execute a control method of controlling an information processing device, the control method comprising:

setting an opto-electronic transfer function (OETF);

setting an electro-optical transfer function (EOTF);

generating a developed image by applying development processing to a RAW image according to the set OETF; and performing control to display the developed image on a display, wherein in a case where (a) the set OETF corresponds to a high dynamic range and (b) the set EOTF corresponds to a dynamic range different from the high dynamic range, control is performed to display the developed image on the display without performing gradation conversion.

* * * * *